United States Patent
Fujiwara

(10) Patent No.: US 10,891,164 B2
(45) Date of Patent: Jan. 12, 2021

(54) RESOURCE SETTING CONTROL DEVICE, RESOURCE SETTING CONTROL SYSTEM, RESOURCE SETTING CONTROL METHOD, AND COMPUTER-READABLE RECORDING MEDIUM

(71) Applicant: NEC Corporation, Tokyo (JP)

(72) Inventor: Takumi Fujiwara, Tokyo (JP)

(73) Assignee: NEC CORPORATION, Tokyo (JP)

(*) Notice: Subject to any disclaimer, the term of this patent is extended or adjusted under 35 U.S.C. 154(b) by 16 days.

(21) Appl. No.: 16/475,497

(22) PCT Filed: Jan. 9, 2018

(86) PCT No.: PCT/JP2018/000162
§ 371 (c)(1),
(2) Date: Jul. 2, 2019

(87) PCT Pub. No.: WO2018/131556
PCT Pub. Date: Jul. 19, 2018

(65) Prior Publication Data
US 2019/0340028 A1 Nov. 7, 2019

(30) Foreign Application Priority Data
Jan. 12, 2017 (JP) .............................. 2017-003083

(51) Int. Cl.
*G06F 9/50* (2006.01)
(52) U.S. Cl.
CPC .......... *G06F 9/5016* (2013.01); *G06F 9/5022* (2013.01); *G06F 2209/50* (2013.01)
(58) Field of Classification Search
CPC .............. G06F 9/5016; G06F 2209/50; G06F 2209/508; G06F 9/5022
(Continued)

(56) References Cited

U.S. PATENT DOCUMENTS 10,372,926 B1 * 8/2019 Leshinsky ............. H04L 9/0894
2003/0018694 A1 * 1/2003 Chen ....................... H04L 67/34
709/200
(Continued)

FOREIGN PATENT DOCUMENTS

JP 2007-518169 A 7/2007
JP 2008-310812 A 12/2008
(Continued)

OTHER PUBLICATIONS

International Search Report for PCT Application No. PCT/JP2018/000162, dated Feb. 20, 2018.
(Continued)

*Primary Examiner* — Hashem Farrokh

(57) ABSTRACT

Provided is to appropriately allocate resources among the versions in the system, the resource setting control device includes: determination unit that extracts a load pattern of a service request in a specific period of time from a) a request history, including information of a group, the requested version, and a resource usage during execution of the service, and b) the request history in operation information storage, and updates the reference pattern when detecting that change from the reference pattern is beyond a specific range; and change unit that determines, for each of the versions, a resource request amount, based on a peak value of the resource usage in the specific period of time and a number of server devices providing the version, when detecting the load pattern change, and outputs the determined resource request amount.

14 Claims, 11 Drawing Sheets

(58) Field of Classification Search
USPC .......................................................... 711/100
See application file for complete search history.

(56) References Cited

U.S. PATENT DOCUMENTS

2005/0155033 A1\* 7/2005 Luoffo .................. G06F 9/5088
　　　　　　　　　　　　　　　　　　　　　　　　　　718/104
2008/0313649 A1　12/2008　Tian

FOREIGN PATENT DOCUMENTS

| JP | 2016-110248 A | 6/2016 |
| JP | 2017-004235 A | 1/2017 |

OTHER PUBLICATIONS

English translation of Written opinion for PCT Application No. PCT/JP2018/000162.

\* cited by examiner

RESOURCE SETTING CONTROL DEVICE, RESOURCE SETTING CONTROL SYSTEM, RESOURCE SETTING CONTROL METHOD, AND COMPUTER-READABLE RECORDING MEDIUM

This application is a National Stage Entry of PCT/JP2018/000162 filed on Jan. 9, 2018, which claims priority from Japanese Patent Application 2017-003083 filed on Jan. 12, 2017, the contents of all of which are incorporated herein by reference, in their entirety.

TECHNICAL FIELD

The present invention relates to a resource setting control device, a resource setting control system, a resource setting control method, and a computer-readable recording medium, and particularly to resource setting control of allocating resources in a situation where a plurality of versions of a service coexist in a system.

BACKGROUND ART

In recent years, with improvement of a cloud environment and development of a virtualization technique and a container technique, practical use of a Web service has been progressing. Examples of the Web service includes representational state transfer (REST) and a simple object access protocol (SOAP). In the Web service, even after a new version of the service is released, an existing version of the service is not immediately removed, and there occurs a situation in which a plurality of versions of the service coexist on a single machine. This is because it generally takes some time for a user to make a shift from an existing version of a service to a new version.

Respective versions of a service are in loose coupling, but provide almost the same basic function. For this reason, when there is a resource pool management function for waiting threads of requests for the service, a database (DB) connection, resources need to be secured for each of the versions of the service.

At this time, all the versions do not equally need the same amount of resources, and while some of the versions of the service mainly operates, another of the versions of the service remains for backward compatibility, but is hardly used. Since the versions differ from each other in an amount of resource consumption, it is important to allocate appropriate resources to each of the versions.

In connection with resource allocation, the following techniques are disclosed.

PTL 1 discloses a virtualization execution device that improves convenience of a virtualized environment of a server device. When determining system configuration information, the device recommends the same system configuration information as that in the past, for a user for which a use history of the same service exists. Further, when resources are insufficient at a time of service execution, the device adds a virtual machine or a container, and thereby extends an amount of resources.

PTL 2 discloses a system that maintains an operation of an application in a quasi-optimum grid environment. In the system, a service availability management agent monitors a performance state of a resource node. When the performance state does not meet a prescribed operation requirement, the service availability management agent adjusts use of the resource node of the application.

CITATION LIST

Patent Literature

[PTL 1]
 Japanese Unexamined Patent Application Publication No. 2016-110248
[PTL 2]
 Published Japanese Translation of PCT International Publication for Patent Application (Kohyo) No. 2007-518169

SUMMARY OF INVENTION

Technical Problem

In a situation where a plurality of versions of a service coexist on a single machine, degrees of resource amounts required by the respective ones of the service change depending on a progress state of version shifting by users. Examples of the progress state include the number of the versions in operation and the number of client devices using each one of the service. For this reason, it is difficult to calculate an optimum setting from a situation of an entire system.

When the number of machines, the number of service versions, or the number of clients increases, it takes enormous processing cost to calculate an optimum setting value. Thus, it is difficult for a person to calculate a necessary resource amount in real time.

Further, when a new version of a Web service used by a client application is added, a load situation of all servers providing the service changes. Thus, on these occasions, it is required to make a review in order to optimize a resource setting in all the servers. However, since the client and the server are in a relation of loose coupling, and the Web service called by the client depends on installation in the client. For this reason, it is difficult for the server to grasp the number of clients using each of the versions of the Web service, and an appropriate occasion for setting change cannot be grasped.

Each of the techniques disclosed in PTL 1 and PTL 2 described above does not reallocate resources in response to change in loads among used versions of a service, i.e., progress of version shifting by a user, and does not solve the above-described problem.

An object of the present invention is to provide a resource setting control device that solve the above-described problem. The resource setting control device review allocation of resources in response to change in loads among versions of a service that are used in parallel due to service shifting.

Solution to Problem

An aspect of the present invention is a resource setting control device. The device includes:

resource-setting-change determination means that extracts a load pattern of a service request in a specific period of time from a) a request history, of a service request requesting a service of one of a plurality of versions, including information of a group, the requested version, and a resource usage during execution of the service, and b) the request history in operation information storage means, storing a reference pattern of a load for the service request, and updates the reference pattern when detecting that change from the reference pattern is beyond a specific range; and resource setting change means that determines, for each of the versions, a resource request amount, based on a peak value of the resource usage in the specific period of time and a number of server devices providing the version, when detecting change of the load pattern, and outputs the determined resource request amount.

An aspect of the present invention is a resource setting control method. The method includes:

storing a) a request history, of a service request requesting a service of one of a plurality of versions, including information of a group, the requested version, and a resource usage during execution of the service, and b) a reference pattern of a load for the service request;

extracting, from the request history, a load pattern of the service request in a specific period of time, and updating the reference pattern when detecting that change from the reference pattern is beyond a specific range; and determining, for each of the versions, a resource request amount, based on a peak value of the resource usage in the specific period of time and a number of server devices providing the version, at time of detecting change of the load pattern, and outputting the determined resource request amount.

An aspect of the present invention is a computer-readable recording medium that stores a resource setting control program. The program causes a computer to execute:

resource-setting-change determination processing of extracting a load pattern of a service request in a specific period of time from a) a request history, of a service request requesting a service of one of a plurality of versions, including information of a group, the requested version, and a resource usage during execution of the service, and b) the request history in operation information storage means storing a reference pattern of a load for the service request, and updating the reference pattern when detecting that change from the reference pattern is beyond a specific range; and resource setting change processing of determining, for each of the versions, a resource request amount, based on a peak value of the resource usage in the specific period of time and a number of server devices providing the version, at time of detecting change of the load pattern, and outputting the determined resource usage.

Advantageous Effects of Invention

The resource setting control device according to the present invention can appropriately allocate resources among versions in a system that provides a plurality of versions of a service in parallel in a process of version shift of the service.

EXAMPLE EMBODIMENT

First Example Embodiment

<Configuration>

Figure 1:
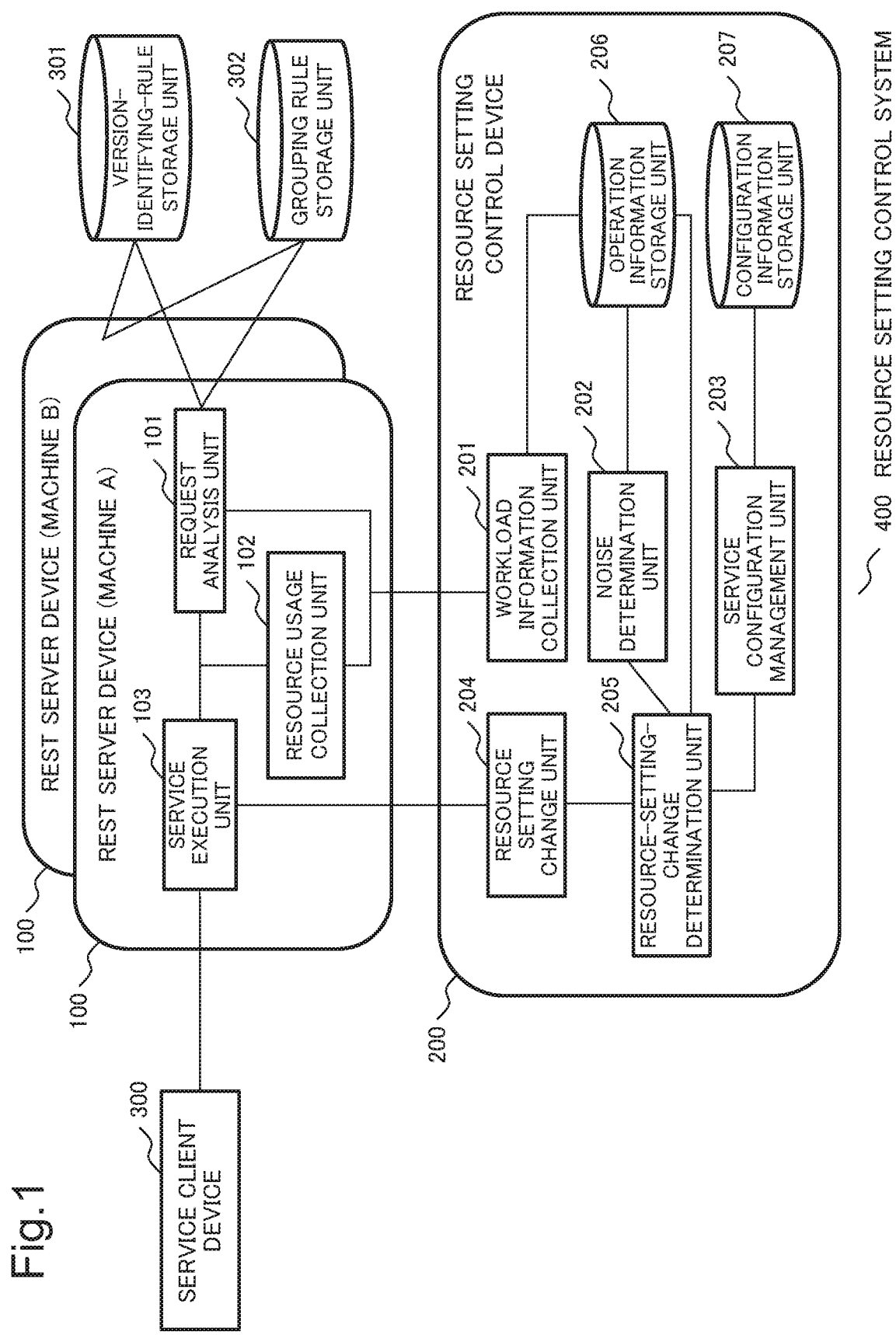
FIG. 1 is a diagram illustrating a configuration of a resource setting control system 400 according to a first example embodiment.

FIG. 1 is a diagram illustrating a configuration of a resource setting control system 400 according to a first example embodiment. The resource setting control system 400 includes a REST server device 100 and a resource setting control device 200 connected to each other by a communication network, and a service client device 300 connected to the REST server device 100. A plurality of the REST server devices 100 and a plurality of the service client devices 300 may exist.

The REST server device 100 provides a plurality of versions of a service to the service client device 300. The resource setting control device 200 determines resource allocation among the versions. Herein, examples of resources include a waiting thread for a request for the service, a DB connection, a memory area, and a communication path that are subjected to pool management.

The REST server device 100 includes a service execution unit 103, a request analysis unit 101, and a resource usage collection unit 102. The REST server device 100 includes a version-identifying-rule storage unit 301 and a grouping rule storage unit 302, or shares, with another device, the version-identifying-rule storage unit 301 and the grouping rule storage unit 302.

The service execution unit 103 receives a service request (hereinafter, abbreviated as a request) from the service client device 300, and executes a specified version of a service. When a plurality of the REST server devices 100 exist, a request of each of the service client devices 300 is appropriately allocated to one of the REST server devices 100 by an un-illustrated load balancer, for example.

The request analysis unit 101 analyzes a request for the service, identifies the version of the used service, and groups the request. At this time, the request analysis unit 101 refers to the version-identifying-rule storage unit 301 and the grouping rule storage unit 302.

The resource usage collection unit 102 collects a resource usage at a time of execution of the service in such a manner that the group can be identified in units of the versions. The resource usage collection unit 102 transmits the collected resource usage to the resource setting control device 200.

The resource setting control device 200 includes a workload information collection unit 201, a noise determination unit 202, a service configuration management unit 203, a resource setting change unit 204, and a resource-setting-change determination unit 205. The resource setting control device 200 further includes an operation information storage unit 206 and a configuration information storage unit 207.

The workload information collection unit 201 receives, from the resource usage collection unit 102 of each of the REST server devices 100, a resource usage at a time of execution of the service. The workload information collection unit 201 stores the received resource usage in the operation information storage unit 206, and accumulates the received resource usage as an integrated record of the resource setting control system 400.

The service configuration management unit 203 uses the configuration information storage unit 207 and thereby grasps a service operation situation for each of the versions, in the entire resource setting control system 400.

The resource-setting-change determination unit 205 extracts a load pattern of requests generated and processed in a distributed environment, based on the information accumulated in the operation information storage unit 206. Based on the situation thereof, the resource-setting-change determination unit 205 checks whether or not allocation of resources among the versions needs to be changed. At this time, from noise-like information of the load pattern, the noise determination unit 202 checks whether or not change in the load pattern over a long term exists.

The resource setting change unit 204 calculates an appropriate setting value of resources for each version. The calculation is performed based on the service operation situation of each version in the entire resource setting control system 400 and a resource use situation of a group of the requests. Then, the resource setting change unit 204 transmits, to the REST server device 100, a resource allocation change command based on the calculated value.

Figure 2:
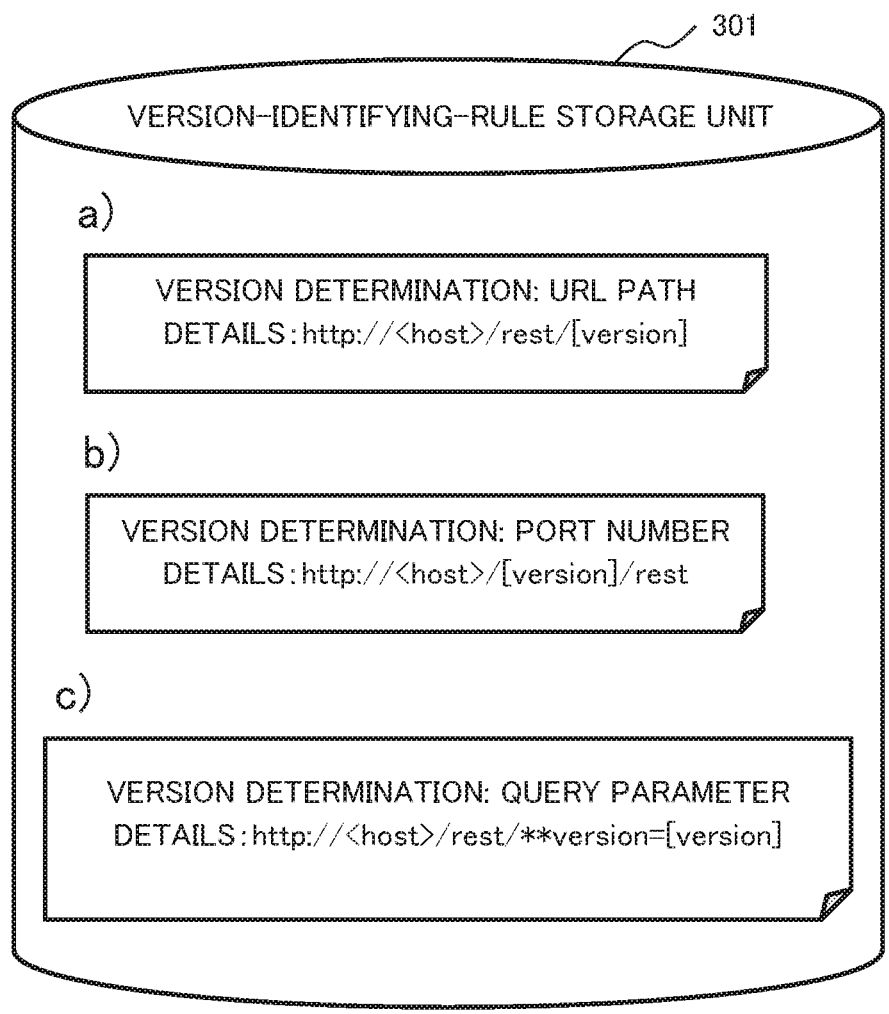
FIG. 2 is a diagram illustrating examples of a version identifying rule stored in a version-identifying-rule storage unit 301.

FIG. 2 is a diagram illustrating examples of a version identifying rule stored in the version-identifying-rule storage unit 301. From information in the request, the request analysis unit 101 identifies an requested version of the service, in accordance with the version identifying rule stored in the version-identifying-rule storage unit 301. The version identifying rule specifies which part of which information of the request to extract version information from.

In FIG. 2, a) is a setting example in which a version is determined with a uniform resource locator (URL). This rule specifies that the version information is extracted from a part that is indicated by "version" of a URL path in the request and that follows "rest/".

In FIG. 2, b) is a setting example in which a version is determined with a port number. This rule specifies that the version information is extracted from a part that is indicated by "version" of the port number in the request and that follows "//<host>/".

Similarly, in FIG. 2, c) is a setting example in which a version is determined with a query parameter. This rule specifies that the version information is extracted from a part that follows "version=".

Figure 3:
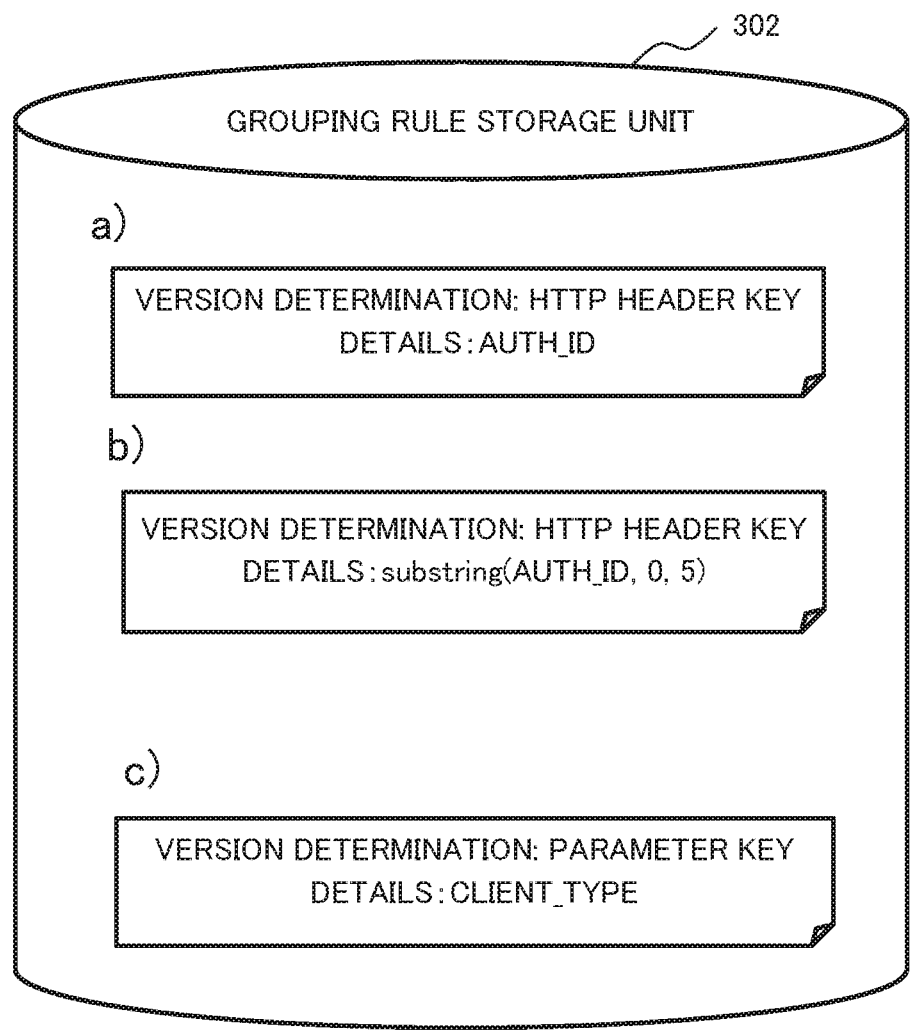
FIG. 3 is a diagram illustrating examples of a grouping rule stored in a grouping rule storage unit 302.

FIG. 3 is a diagram illustrating examples of a grouping rule stored in the grouping rule storage unit 302. The request analysis unit 101 identifies a group identifier to which a request belongs, in accordance with the grouping rule stored in the grouping rule storage unit 302. The grouping rule specifies which part of which information of the request to extract the group identifier from.

In FIG. 3, a) is a setting example in which grouping is performed with an authentication identification (Id). This rule specifies that a group identifier is extracted from an AUTH_ID field of a hyper text transfer protocol (HTTP) header key in the request.

In FIG. 3, b) is a setting example in which grouping is performed with a part of an authentication Id. This rule specifies that a group identifier is extracted from 0th to 5th byte in the AUTH_ID field of the HTTP header key in the request. Note that "substring" is a function that specifies cutting of values.

In FIG. 3, c) is a setting example in which grouping is performed with "Type" of a client application. This rule specifies that a group identifier is extracted from a parameter key "CLIENT_TYPE" in the request.

Figure 4:
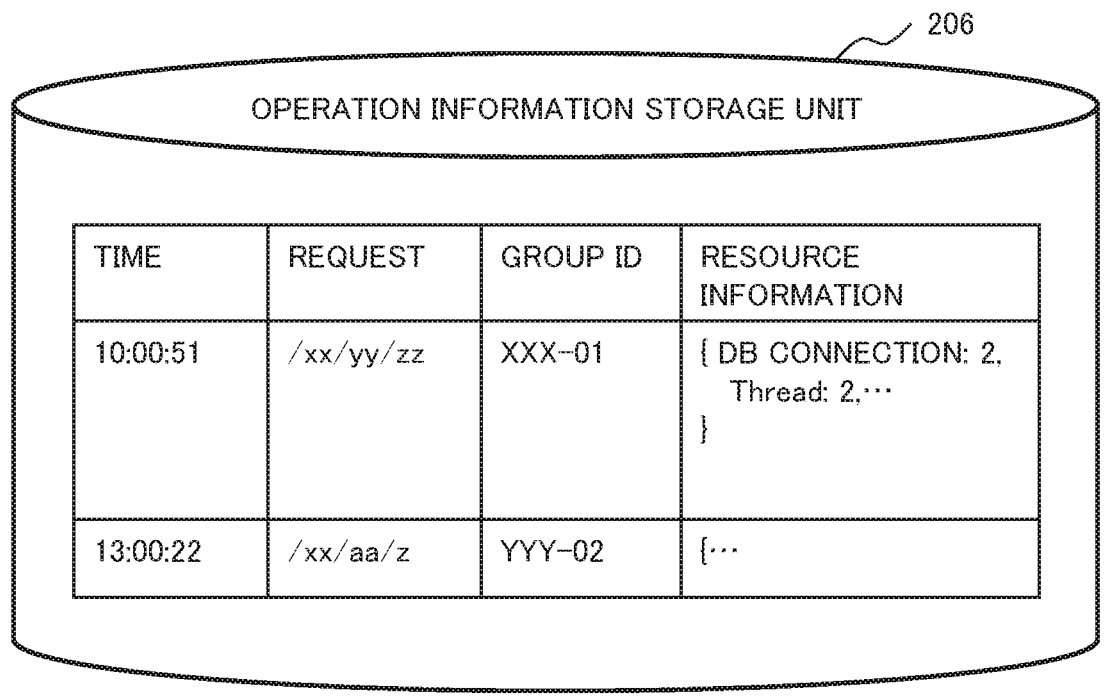
FIG. 4 is a diagram illustrating an example of workload information stored in an operation information storage unit 206.

FIG. 4 is a diagram illustrating an example of workload information stored in the operation information storage unit 206. The workload information is a history of requests received and processed by each of the REST server devices 100. The request history information is information collected by the request analysis unit 101 and the resource usage collection unit 102 of each of the REST server devices 100. Examples of respective request records in the history include a time at which processing is completed, version identifying information of the requested service, a group identifier, and a type and an amount of resources required for processing the request.

Figure 5:
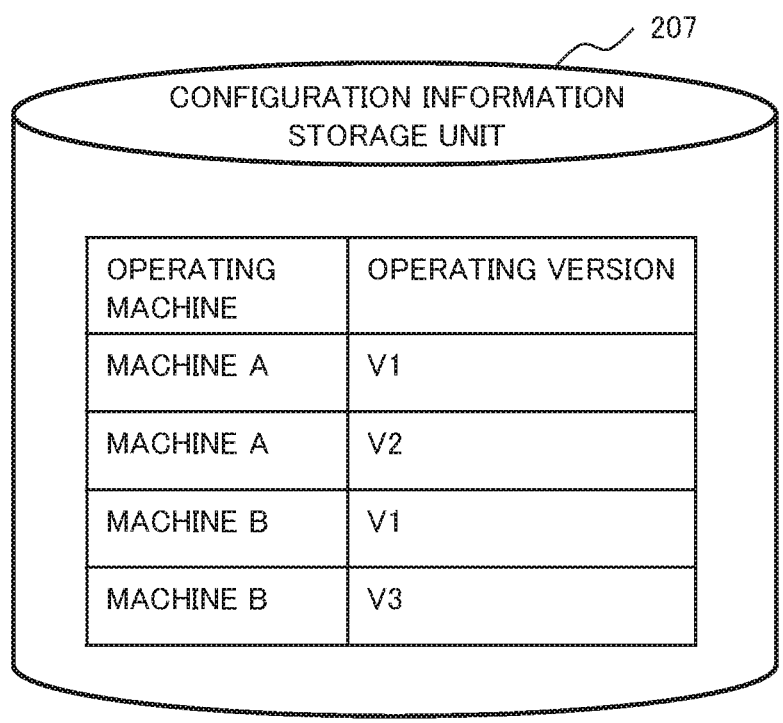
FIG. 5 is a diagram illustrating an example of a service operation situation information of each version stored in a configuration information storage unit 207.

FIG. 5 is a diagram illustrating an example of service operation situation information of each version stored in the configuration information storage unit 207. In the service operation situation information, for example, identifiers (a machine A, a machine B, etc.) of the REST server devices 100 and the version numbers of the service provided on the REST server devices 100 are stored. The storing is made in such a manner that the identifiers and the version numbers are associated with each other. The example in FIG. 5 indicates that the service of version 1 represented as V1 is provided on two REST server devices 100 which are the machines A and B.

Herein, the service execution unit 103, the request analysis unit 101, and the resource usage collection unit 102 of the REST server device 100 are configured by logic circuits. The version-identifying-rule storage unit 301 and the grouping rule storage unit 302 are stored in a non-volatile storage device such as a disk.

Figure 6:
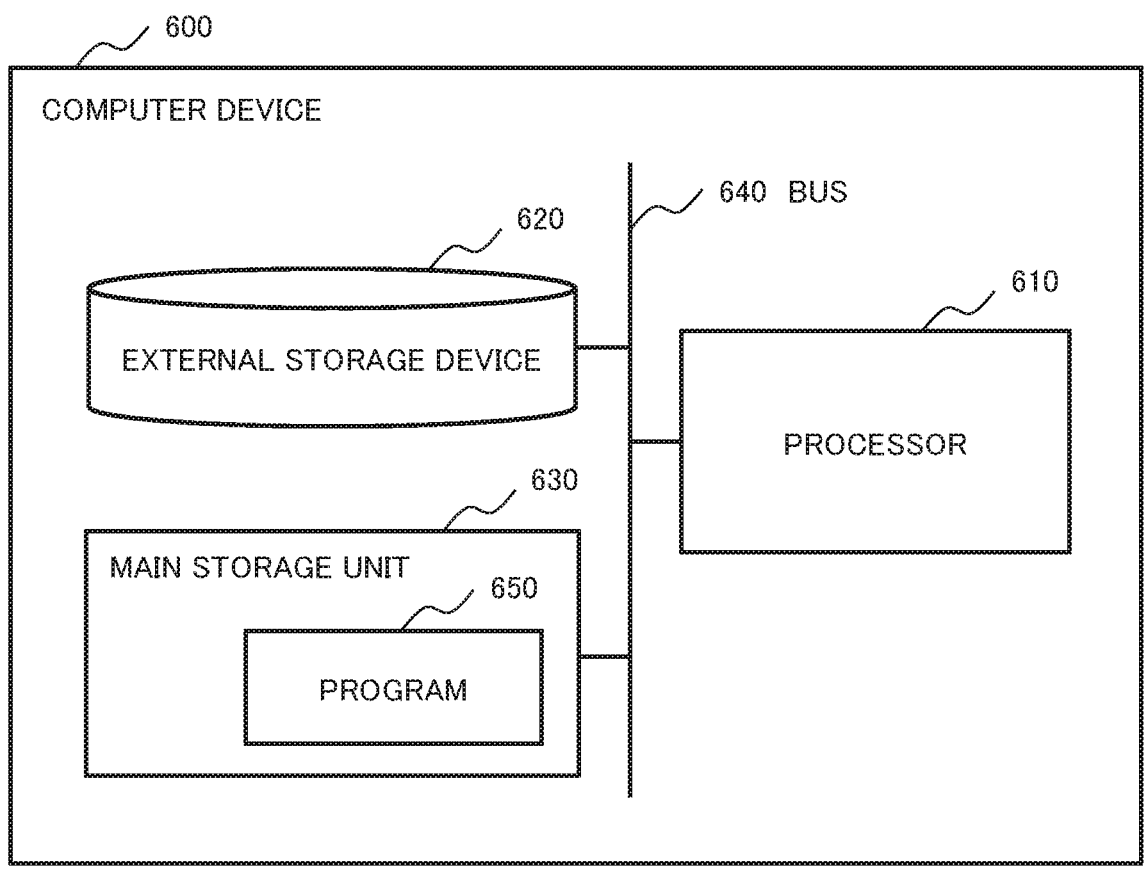
FIG. 6 is a diagram illustrating a configuration of a computer device 600.

The REST server device 100 may be implemented by a computer device 600. FIG. 6 is a diagram illustrating a configuration of the computer device 600. The computer device 600 includes a processor 610, a main storage unit 630, and an external storage device 620 connected to each other by a bus 640. The processor 610 reads data from and writes data in the main storage unit 630 and the external storage device 620 via the bus 640. Further, the processor 610 executes a program 650 stored in the main storage unit 630. Note that the program 650 may be initially stored in the external storage device 620. At a time of an initial setting of the computer device 600, the processor 610 may load the program 650 from the external storage device 620 into the main storage unit 630.

Herein, the main storage unit 630 is a semiconductor memory device. The external storage device 620 is a storage device such as a disk device or a semiconductor storage device.

By executing the program 650, the processor 610 functions as the service execution unit 103, the request analysis unit 101, and the resource usage collection unit 102. In other words, by executing the program 650, the processor 610 executes the processing performed by the service execution unit 103, the request analysis unit 101, and the resource usage collection unit 102.

The external storage device 620 may be used as the version-identifying-rule storage unit 301 and the grouping rule storage unit 302.

Further, the workload information collection unit 201, the noise determination unit 202, the service configuration management unit 203, the resource setting change unit 204, and the resource-setting-change determination unit 205 of the resource setting control device 200 are configured by logic circuits. The operation information storage unit 206 and the configuration information storage unit 207 are stored in a non-volatile storage device such as a disk.

The resource setting control device 200 may be implemented by the computer device 600 illustrated in FIG. 6.

The processor 610 executes the program 650. Thereby, the processor 610 functions as the workload information collection unit 201, the noise determination unit 202, the service configuration management unit 203, the resource setting change unit 204, and the resource-setting-change determination unit 205. In other words, by executing the program 650, the processor 610 executes the processing performed by the workload information collection unit 201, the noise determination unit 202, the service configuration management unit 203, the resource setting change unit 204, and the resource-setting-change determination unit 205.

The external storage device 620 may be used as the operation information storage unit 206 and the configuration information storage unit 207.

<Operation>

Figure 7:
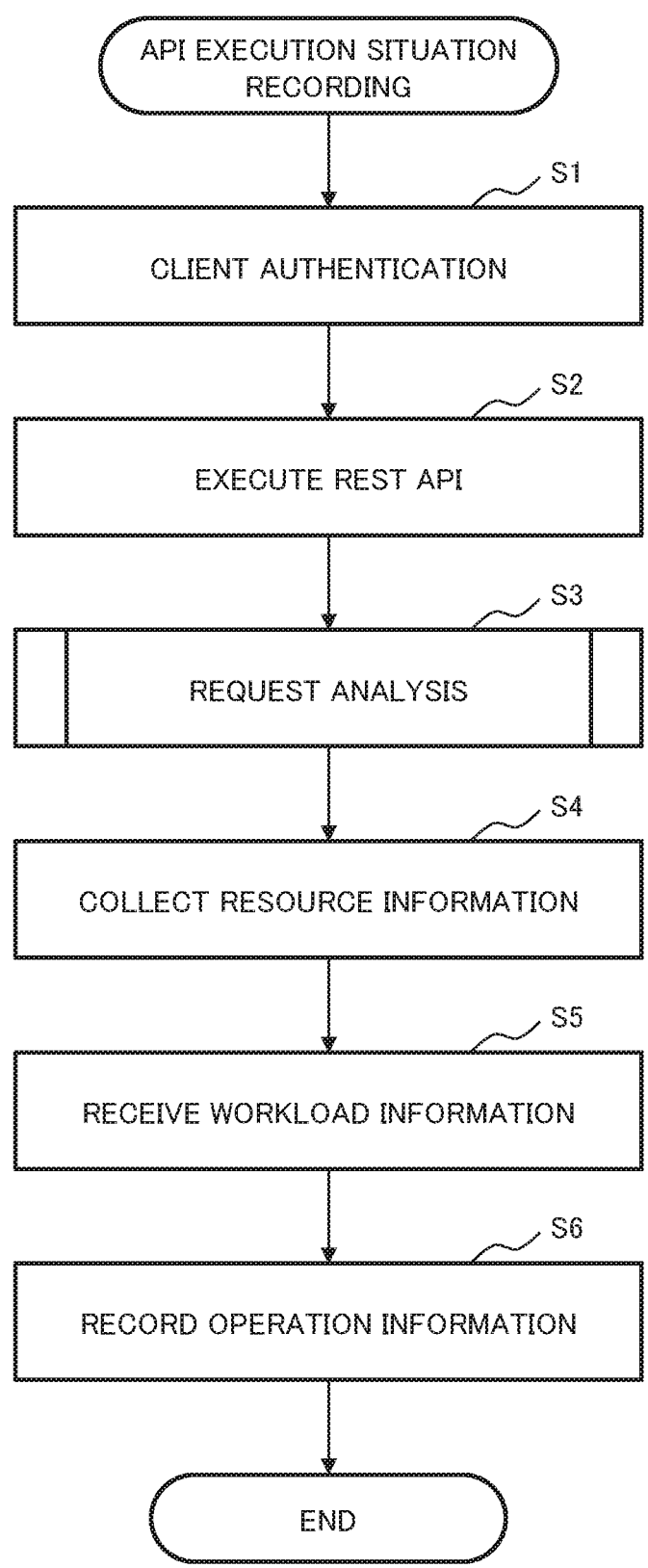
FIG. 7 is a flowchart illustrating an operation in which a REST server device 100 receives a request and executes a service, and a history of the request is accumulated in the operation information storage unit 206 of a resource setting control device 200.

FIG. 7 is a flowchart illustrating an operation in which the REST server device 100 receives a request and executes the service, and a history of the request is accumulated in the operation information storage unit 206 of the resource setting control device 200.

First, in order to execute a service (REST API), the service client device 300 authenticates a client (S1). The REST server device 100 authenticates the client, and gives an authenticated token to the service client device 300. Each subsequent request from the service client device 300 is sent to the REST server device 100 in a state where the authenticated token is added to the request.

When receiving a request, the service execution unit 103 of the REST server device 100 executes the service (S2). At a time of the service execution, the request analysis unit 101 analyzes the request. Then, the request analysis unit 101 identifies, from the request, a called version of the service, extracts a group identifier for grouping, and performs transmission thereof to the resource setting control device 200 (S3).

Figure 8:
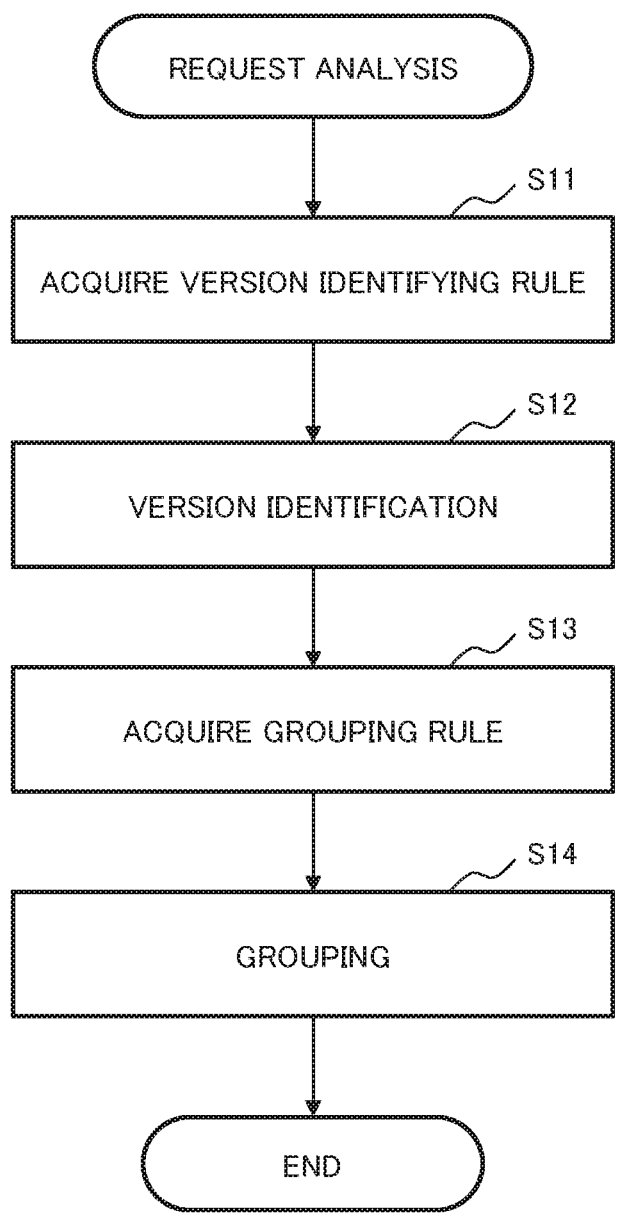
FIG. 8 is a flowchart illustrating details of request analysis performed by a request analysis unit 101.

FIG. 8 is a flowchart illustrating details of the request analysis performed by the request analysis unit 101 at S3 in FIG. 7b.

First, the request analysis unit 101 uses aversion-identifying-rule stored in the version-identifying-rule storage unit 301 (S11), thereby identifies, from information of the transmitted request, which version of the service is requested by the request. The request analysis unit 101 transmits the identified version to the resource setting control device 200 (S12).

In some case, a version is specified by a URL path. In this case, for example, the REST server device 100 discloses an API of the version 1 with a path such as "http://host/api/v1/service". Further, for example, the REST server device 100 discloses an API of the version 2 with a path such as "http://host/api/v2/service". Then, by using the information included in the paths, the request analysis unit 101 recognizes that "http://host/api/v1/" indicates the API of the version 1, and "http://host/api/v2/" indicates the API of the version 2.

In this case, the version-identifying-rule describes that a "URL path" is used for identifying a version, and describes a location that is in a character string of the URL path and that indicates the version (refer to a) in FIG. 2).

Next, by using a grouping rule stored in the grouping rule storage unit 302 (S13), the request analysis unit 101 extracts, from the information in the transmitted request, an identifier of a group to which the request belongs. The request analysis unit 101 transmits the extracted identifier to the resource setting control device 200 (S14).

Requests are grouped in meaningful units. For example, when requests from users having the same Id are used as one group, the request analysis unit 101 extracts, from the request, the user Id as a group identifier. As another example, when requests are unified for each company to which users belong, the request analysis unit 101 extracts a company code included in the Id.

First, an administrator of the resource setting control system 400 determines how to group resources in order to determine resource allocation among the versions. Next, the administrator stores in advance, as a grouping rule, which part of the request the identification information of the group is extracted from, in the grouping rule storage unit 302 (refer to FIG. 3).

When the request analysis (S3 in FIG. 7) is completed, the resource usage collection unit 102 acquires, from the service execution unit 103 for example, a resource usage used for executing the request. The resource usage collection unit 102 transmits the acquired resource usage to the resource setting control device 200 (S4). Specifically, the service execution unit 103 may monitor a resource usage during the request execution, and may record, in the request, the monitored resource usage. The resource usage collection unit 102 may refer to the record.

In the resource setting control device 200, the workload information collection unit 201 receives information sent from the request analysis unit 101 and the resource usage collection unit 102 (S5). The workload information collection unit 201 accumulates, in the operation information storage unit 206, the received information as a request history (refer to S6 and FIG. 4). At this time, the workload information collection unit 201 regards log-in to log-out as one workload, and records requests for each group and for each time zone.

Figure 9:
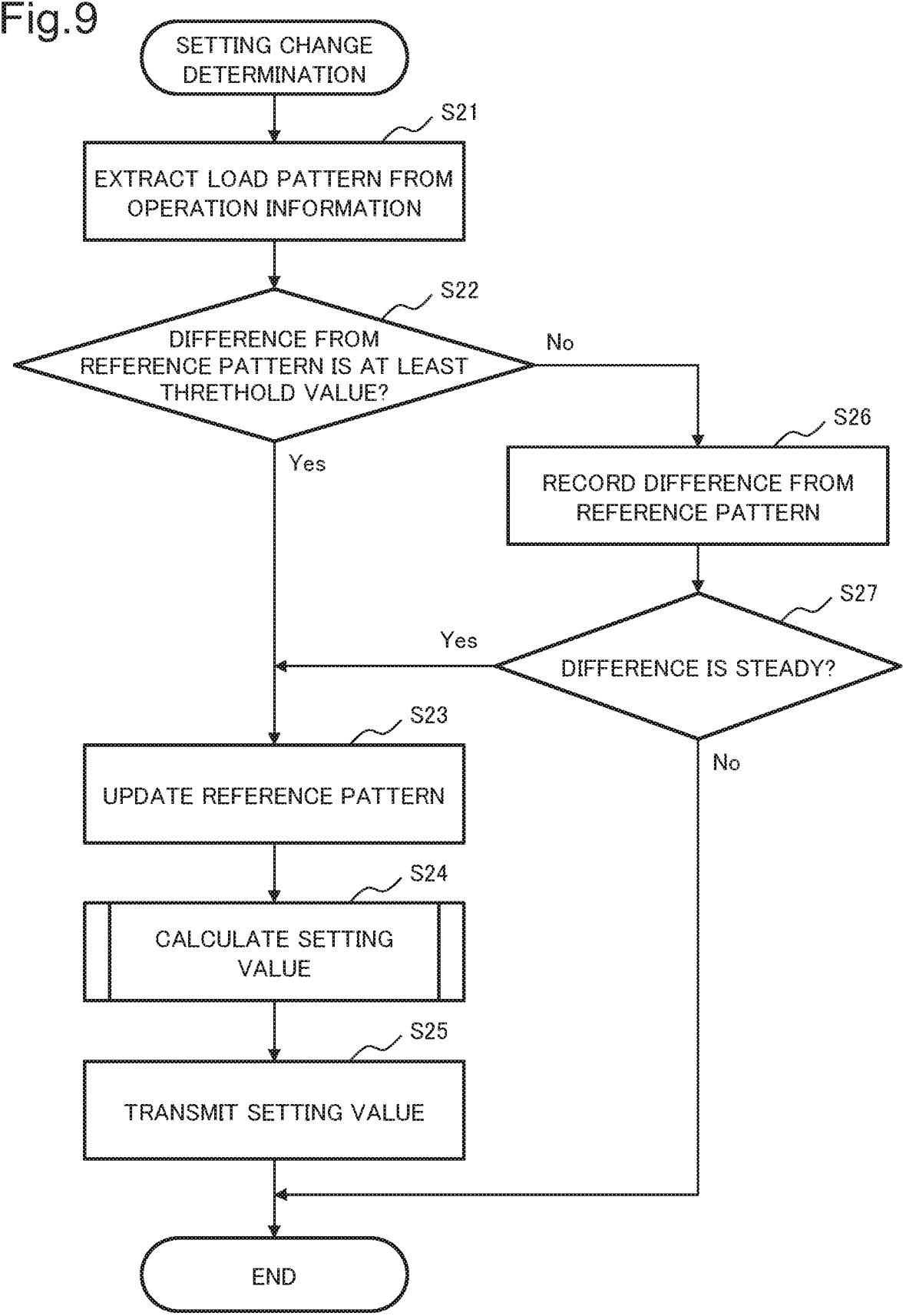
FIG. 9 is a flowchart of setting change determination processing performed by a resource-setting-change determination unit 205.

FIG. 9 is a flowchart of setting change determination processing performed by the resource-setting-change determination unit 205. The resource-setting-change determination unit 205 is activated every predetermined period of time, and extracts a load pattern from a request history in the operation information storage unit 206 (S21). In many cases of a steady-state operation, a pattern of request transmission can be made in a certain constant cycle. For each predetermined period of time, the resource-setting-change determination unit 205 extracts the pattern from the history of requests.

The predetermined period of time is a unit period of time in which a tendency of request transmission timings appear when requests are given a meaning by a collection of a certain time series such as one day, one week, or one month. The predetermined period of time is a period of time as follows, for example.

When a load becomes high or low only at a specific hour in one day, the predetermined period of time is a day unit, and the resource-setting-change determination unit 205 extracts a pattern of a load for each hour.

When a load becomes high or low only on a specific day of one week, the predetermined period of time is a one-week unit, and the resource-setting-change determination unit 205 extracts a pattern of a load for each day of a week.

When a load becomes high or low in a first or last week or day in one month, the predetermined period of time is a one-month unit, and the resource-setting-change determination unit 205 extracts a pattern of a load for each week or day.

When a load becomes high or low in a first or last month, week, or day in a quarter (three months), the predetermined period of time is a quarter unit. In this case, the resource-setting-change determination unit 205 extracts a pattern of a load for each month, week, or day.

When a load becomes high or low in a specific month, week, or day in a half year or a year, the predetermined period of time is a half-year unit or a year unit. In this case, the resource-setting-change determination unit 205 extracts a pattern of a load for each month, week, or day.

After extracting a load pattern from a request history of a latest cycle at S21, the resource-setting-change determination unit 205 compares the pattern with a reference pattern. When there is a significant difference ("yes" at S22), the resource-setting-change determination unit 205 updates the reference pattern (S23), and activates the resource setting change unit 204 (S24). When there is not a significant difference ("no" at S22), the resource-setting-change determination unit 205 activates the noise determination unit 202 (S26).

As apparent from the above description, the reference pattern is the latest load pattern established in a past cycle, and serves as a reference for determining change of a load pattern extracted from a request history of the latest cycle. For example, the reference pattern is stored in the operation information storage unit 206, and an initial value thereof is given by the administrator.

When activated, the noise determination unit 202 records, as noise, a difference between the extracted load pattern and the reference pattern (S26), and compares the difference with differences for several past cycles. When the difference is steady ("yes" at S27), the noise determination unit 202 makes a notification to the resource-setting-change determination unit 205. The resource-setting-change determination unit 205 receives the notification, updates the reference pattern (S23), and activates the resource setting change unit 204 (S24). When the difference is not steady ("no" at S27), the resource-setting-change determination unit 205 and the noise determination unit 202 end the operation of this cycle.

Note that the resource-setting-change determination unit 205 may execute the extraction of a pattern, the significance determination, and the reference pattern change for each version or transversely for all the versions. In the case of execution for each version, when a significant difference exists in a load pattern of any one of the versions ("yes" at S22), the resource-setting-change determination unit 205 updates the reference pattern of the version (S23). Then, the resource-setting-change determination unit 205 activates the resource setting change unit 204 (S24).

Here, a) is a load pattern extracted from a request history by the resource-setting-change determination unit 205. Further, b) is a threshold value used by the resource-setting-change determination unit 205 in determining a significant difference. Furthermore, c) is a difference from a reference pattern to be recorded by the noise determination unit 202. For example, a), b), and c) are as follows.

Example 1 a): the most frequently requested version of each group
b): a difference from a reference pattern of a request appearance rate of a new most frequently requested version of each group (e.g., when the appearance rate of the new most frequently requested version increases by at least 20%, it is determined that a significant difference occurs)
c): the most frequently requested version of each group in a current cycle Example 2 a): an appearance timing (a time, a day of a week, a date, or a month) of a peak resource usage
b): a change amount of an appearance timing (e.g., when the timing changes by at least two days, it is determined that a significant difference occurs)
c): an appearance timing of a peak resource usage in a current cycle Example 3 a): a resource usage distribution at each timing in a predetermined period of time
b): the sum of absolute values of resource usage differences at the respective timings (e.g., when the sum of differences in thread usage on respective days of a week becomes at least 50, it is determined that a significance difference occurs)
c): a resource usage distribution in a current cycle Example 4 a): an appearance group
b) and c): none (disappearance and new appearance of a group is unconditionally determined as a significant difference)

The noise determination unit 202 may determine at S27 that the difference is steady, when a difference from a reference pattern recorded does not change at all during a predetermined number of cycles, or may allow a certain range of fluctuation and determine that the difference is steady. The noise determination unit 202 records the difference from the reference pattern in the operation information storage unit 206, for example.

The resource setting change unit 204 activated at S24 calculates a peak value (e.g., peak time zone and usage) for each version by using time-series data. Further, from resource usages of the versions, the resource setting change unit 204 calculates, as time-series data, a resource use situation of an entire system in total for all the versions.

Figure 10:
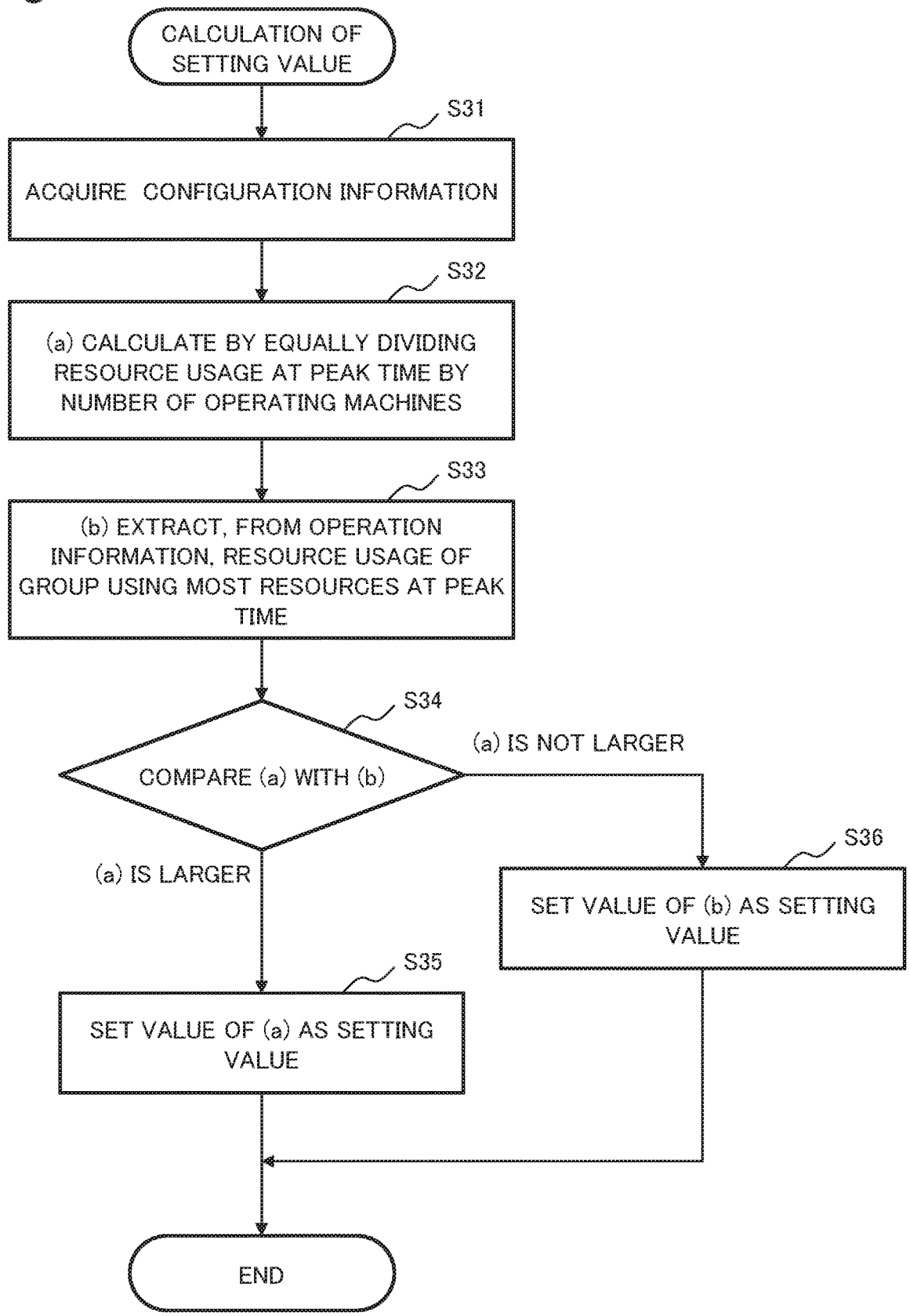
FIG. 10 is a flowchart of calculation processing of a resource setting value for each version by a resource setting change unit 204.

FIG. 10 is a flowchart of processing of calculating a resource setting value of each version performed by the resource setting change unit 204.

The resource setting change unit 204 acquires, from the service configuration management unit 203, the number of the REST server devices 100 providing the service of each version in the resource setting control system 400 (S31).

Next, the resource setting change unit 204 calculates, from a request history in the operation information storage unit 206, a resource usage at a peak time, for each version. The resource setting change unit 204 divides the calculated resource usage by the number of the operating REST server devices 100, for each version, and thereby calculates a numerical value (a) (S32). Further, the resource setting change unit 204 calculates a resource usage (b) of a group that is consuming the most resources at a peak time, for each version (S33).

For each version, the resource setting change unit 204 compares information of (a) with information of (b), and when (a) is larger, sets (a) as a resource setting value. When (b) is larger, the resource setting change unit 204 sets the value of (b) as a resource setting value (S34 to S36). This is because when the value of (b) is large, a specific machine is considered to be burdened with a high load, and there is a risk that the processing is not completely handled under a setting of equally allocated resources.

Lastly, the resource-setting-change determination unit 205 allocates, as a resource request amount, the resource setting value calculated by the above-described method, to each of the REST server devices 100 (S25 in FIG. 9).

In each of the REST server devices 100, for example, the service execution unit 103 receives t resource request amount, and changes a resource amount of a resource pool for a specified version.

Advantageous Effects

The resource setting control device 200 according to the present example embodiment can appropriately allocate resources among the versions in the resource setting control system 400. The resource setting control system 400 provides a plurality of the versions of the service in parallel in a process of shifting among the versions of the service.

A reason is that the resource-setting-change determination unit 205 detects change of a load pattern (progress of the shifting), based on a request history, and determines, based on a resource usage of each version, a resource amount allocated to each version.

Further, when a certain-degree number of clients make the service shifting, the resource setting control device 200 according to the present example embodiment can reallocate resource settings among the versions at an early timing.

A reason is that when a load pattern fluctuates by at least a predetermined threshold value, the resource-setting-change determination unit 205 detects the fluctuation in each predetermined cycle.

Further, even when clients make the service shifting little by little, the resource setting control device 200 according to the present example embodiment can appropriately reallocate the resource settings among the versions.

A reason is that when a load pattern fluctuates within a range that does not exceed a predetermined threshold value, the noise determination unit 202 detects the fluctuation at every plural predetermined cycles.

Second Example Embodiment

Figure 11:
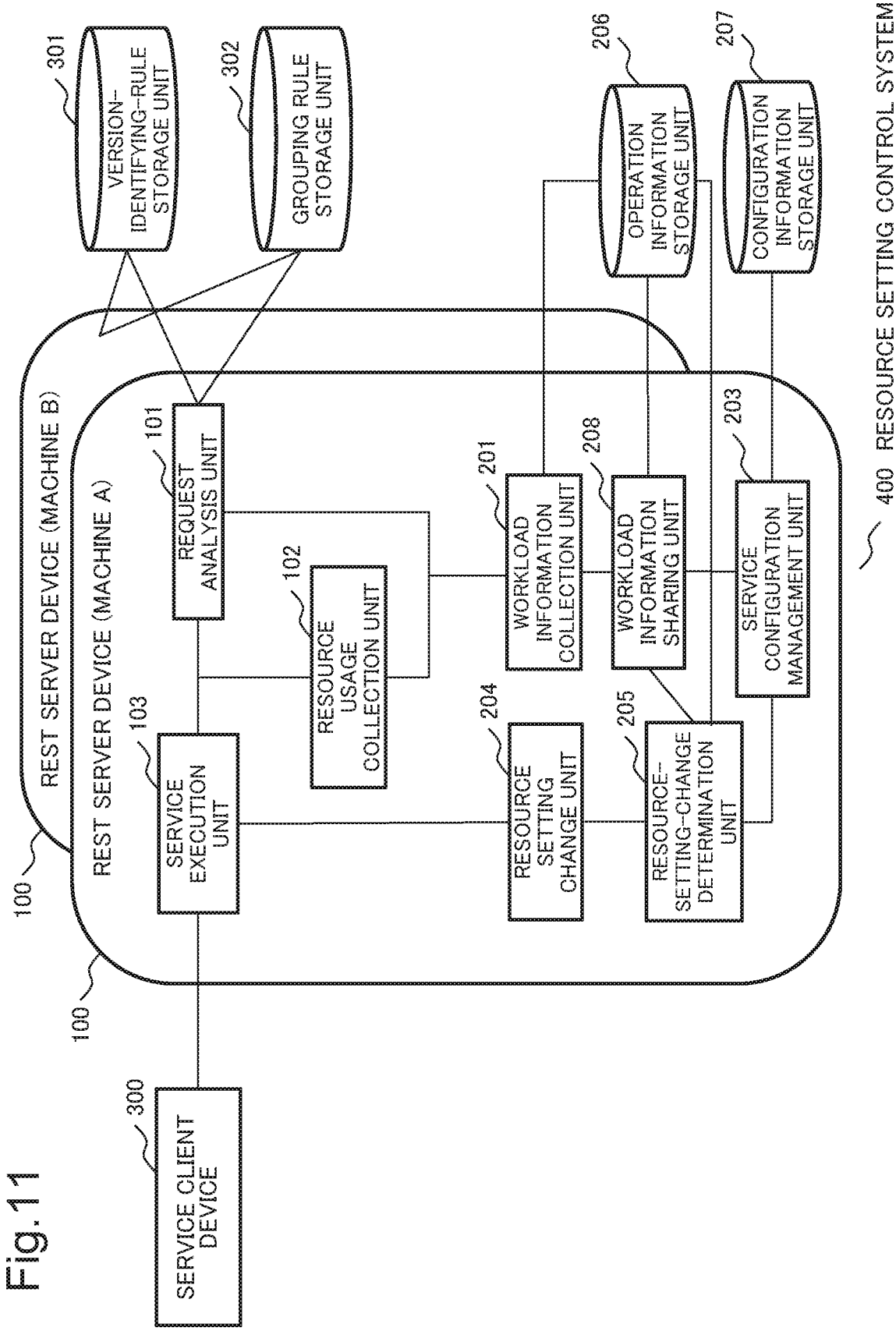
FIG. 11 is a diagram illustrating a configuration of a resource setting control system 400 according to a second example embodiment.

FIG. 11 is a diagram illustrating a configuration of a resource setting control system 400 according to a second example embodiment. In the resource setting control system 400 according to the first example embodiment, the resource setting control device 200 and the REST server device 100 are provided separately. However, in the present example embodiment, both are integrated with each other. For example, all the constituent elements in the resource setting control device 200 in the first example embodiment are arranged on each of the REST server devices 100. The arrangement may be reversely changed.

In order to collectively record processing from login to logout in an operation information storage unit 206, the REST server devices 100 cooperate with each other, and share operation information before recording. Cooperative operation is implemented by a workload information sharing unit 208, and each REST server device 100 shares the operation information storage unit 206.

The information may be shared only by REST server devices 100 in which a service of the same version as a requested version is operating. For this reason, the workload information sharing unit 208 acquires configuration information from a service configuration management unit 203, and determines a sharing range.

Third Example Embodiment

Figure 12:
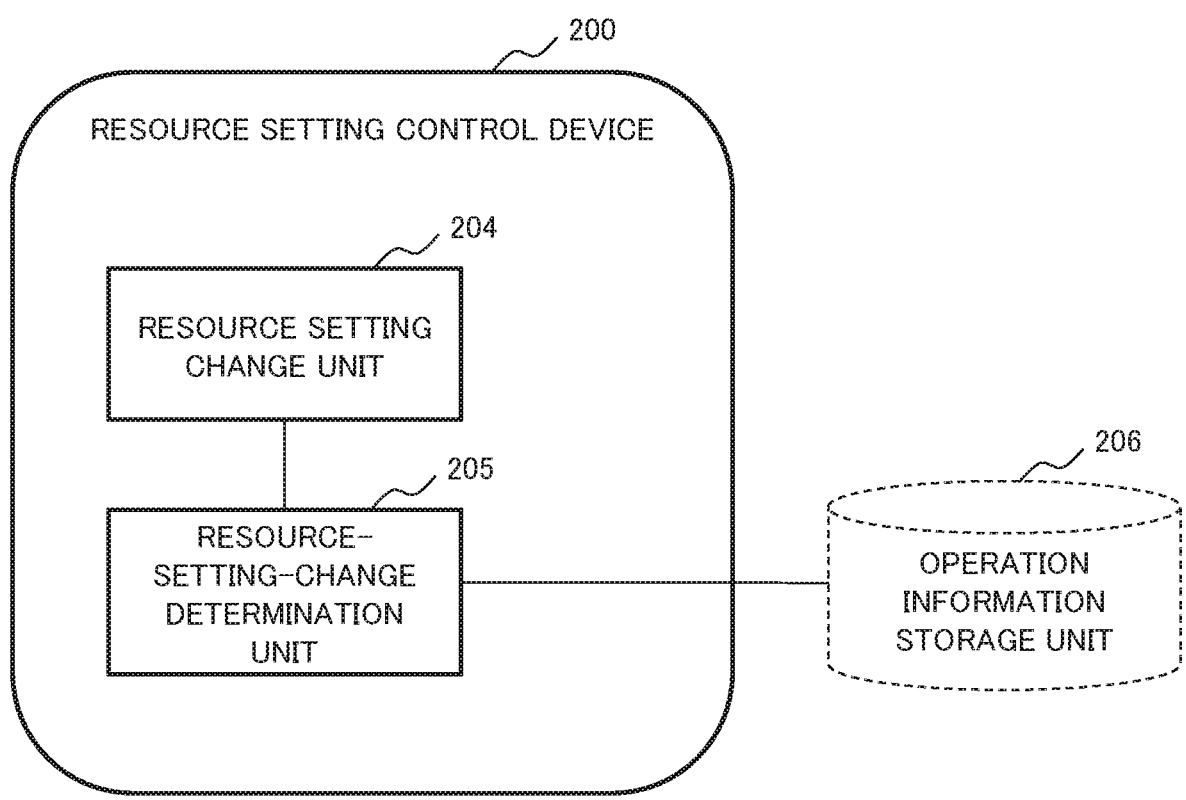
FIG. 12 is a diagram illustrating a configuration of a resource setting control device 200 according to a third example embodiment.

FIG. 12 is a diagram illustrating a configuration of a resource setting control device 200 according to a third example embodiment. The resource setting control device 200 includes a resource-setting-change determination unit 205, a resource setting change unit 204, and an operation information storage unit 206. The resource setting control device 200 may be connected, for example, to an operation information storage unit 206 at a remote location via a communication network, instead of including the operation information storage unit 206.

The operation information storage unit 206 stores a request history including information of a group, a requested version, and a resource usage during service execution, concerning a service request that requests a service of one of a plurality of versions. These pieces of information are collectively transmitted in real time or periodically, from a server device that provides the service. When a processing cycle of the resource-setting-change determination unit 205 is long, the data may be manually moved with a compatible medium. Further, the operation information storage unit 206 stores a reference pattern of loads for service requests.

The resource-setting-change determination unit 205 extracts, from the request history in the operation information storage unit 206, a load pattern of service requests in a predetermined period of time. Then, the resource-setting-change determination unit 205 updates the reference pattern when detecting that the change from the reference pattern is beyond a predetermined range.

When change of a load pattern is detected, the resource setting change unit 204 determines, for each version, a resource request amount, based on a peak value of a resource usage in a predetermined period of time and the number of the server devices that provide the version. The resource setting change unit 204 outputs the determined resource request amount.

The output resource request amount is, for example, received by the server device, and the server device changes a resource amount for a specified version.

The resource setting control device 200 according to the present example embodiment can appropriately allocate resources among the versions in the resource setting control system 400. The resource setting control system 400 provides a plurality of the versions of the service in parallel in a process of shifting among the versions of the service.

A reason is that the resource-setting-change determination unit 205 detects change of a load pattern (progress of the shifting), based on a request history, and the resource setting change unit 204 determines, based on a resource usage of each version, a resource amount allocated to each version.

Although the present invention is described above with reference to the example embodiments, the present invention is not limited to the above-described example embodiments. Various modifications that can be understood by those skilled in the art can be made on a configuration and details of the present invention within the scope of the present invention.

This application claims priority based on Japanese patent application No. 2017-3083 filed on Jan. 12, 2017, the entire disclosure of which is incorporated herein.

REFERENCE SIGNS LIST

100 REST server device
101 Request analysis unit
102 Resource usage collection unit
103 Service execution unit
200 Resource setting control device
201 Workload information collection unit
202 Noise determination unit
203 Service configuration management unit
204 Resource setting change unit
205 Resource-setting-change determination unit
206 Operation information storage unit
207 Configuration information storage unit
208 Workload information sharing unit
300 Service client device
301 Version-identifying-rule storage unit
302 Grouping rule storage unit
400 Resource setting control system
600 Computer device
610 Processor
620 External storage device
630 Main storage unit
640 Bus
650 Program

What is claimed is:

1. A resource setting control device comprising:
A memory storing instructions; and
at least one processor configured to process the instructions for:
extracting a load pattern of a service request in a specific period of time from a) a request history, of a service request requesting a service of one of a plurality of versions, including information of a group, the requested version, and a resource usage during execution of the service, and b) the request history in operation information storage, storing a reference pattern of a load for the service request, and updating the reference pattern when detecting that change from the reference pattern is beyond a specific range; and
determining, for each of the versions, a resource request amount, based on a peak value of the resource usage in the specific period of time and a number of server devices providing the version, when detecting change of the load pattern, and outputting the determined resource request amount.

2. The resource setting control device according to claim 1, wherein the group is formed based on a transmission source of the service request, and
in the determining, extracting, as the load pattern, an associated relation between the group and the requested version.

3. The resource setting control device according to claim 2, wherein: the specific period of time is a day, and in the extracting, extracting, as the load pattern, a load of the service request at a specific time;
the specific period of time is a week, and in the extracting, extracting, as the load pattern, a load of the service request in a specific day of a week;
the specific period of time is a month, and in the extracting, extracting, as the load pattern, a load of the service request in a day or a week in a specific turn in the specific period of time; or
the specific period of time is a plurality of months, and in the extracting, extracting, as the load pattern, a load of the service request in a day, a week, or a month in a specific turn in the specific period of time.

4. The resource setting control device according to claim 2, further comprising
recording, as noise, a difference between the load pattern and the reference pattern, and
judging whether or not the reference pattern needs to be updated, based on the noise in a plurality of the specific periods of time.

5. The resource setting control device according to claim 2, wherein, for each of the versions, in the determining, determining as the resource request amount, a larger value of a) a value acquired by dividing a peak value of the resource usage in the specific period of time by a number of the server devices providing the service of the version and b) largest one of the resource request amounts in the group requesting the version.

6. The resource setting control device according to claim 1, wherein: the specific period of time is a day, and in the extracting, extracting, as the load pattern, a load of the service request at a specific time;
the specific period of time is a week, and in the extracting, extracting, as the load pattern, a load of the service request in a specific day of a week;
the specific period of time is a month, and in the extracting, extracting, as the load pattern, a load of the service request in a day or a week in a specific turn in the specific period of time; or
the specific period of time is a plurality of months, and in the extracting, extracting, as the load pattern, a load of the service request in a day, a week, or a month in a specific turn in the specific period of time.

7. The resource setting control device according to claim 6, further comprising
recording, as noise, a difference between the load pattern and the reference pattern, and
judging whether or not the reference pattern needs to be updated, based on the noise in a plurality of the specific periods of time.

8. The resource setting control device according to claim 6, wherein, for each of the versions, in the determining, determining as the resource request amount, a larger value of a) a value acquired by dividing a peak value of the resource usage in the specific period of time by a number of the server devices providing the service of the version and b) largest one of the resource request amounts in the group requesting the version.

9. The resource setting control device according to claim 1, further comprising
recording, as noise, a difference between the load pattern and the reference pattern, and
judging whether or not the reference pattern needs to be updated, based on the noise in a plurality of the specific periods of time.

10. The resource setting control device according to claim 9, wherein, for each of the versions, in the determining, determining as the resource request amount, a larger value of a) a value acquired by dividing a peak value of the resource usage in the specific period of time by a number of the server devices providing the service of the version and b) largest one of the resource request amounts in the group requesting the version.

11. The resource setting control device according to claim 1, wherein, for each of the versions, in the determining, determining as the resource request amount, a larger value of a) a value acquired by dividing a peak value of the resource usage in the specific period of time by a number of the server devices providing the service of the version and b) largest one of the resource request amounts in the group requesting the version.

12. A resource setting control method comprising:
storing a) a request history, of a service request requesting a service of one of a plurality of versions, including information of a group, the requested version, and a resource usage during execution of the service, and b) a reference pattern of a load for the service request;
extracting, from the request history, a load pattern of the service request in a specific period of time, and updating the reference pattern when detecting that change from the reference pattern is beyond a specific range; and
determining, for each of the versions, a resource request amount, based on a peak value of the resource usage in the specific period of time and a number of server devices providing the version, at time of detecting change of the load pattern, and outputting the determined resource request amount.

13. The resource setting control method according to claim 12, wherein the group is formed based on a transmission source of the service request, and
the method further comprises extracting, as the load pattern, an associated relation between the group and the requested version.

14. A non-transitory computer-readable recording medium that stores a resource setting control program causing a computer to execute processes of:
extracting a load pattern of a service request in a specific period of time from a) a request history, of a service request requesting a service of one of a plurality of versions, including information of a group, the requested version, and a resource usage during execution of the service, and b) the request history in operation information storage storing a reference pattern of a load for the service request, and updating the reference pattern when detecting that change from the reference pattern is beyond a specific range; and
determining, for each of the versions, a resource request amount, based on a peak value of the resource usage in the specific period of time and a number of server devices providing the version, at time of detecting change of the load pattern, and outputting the determined resource usage.

* * * * *